US008913755B2

(12) United States Patent
Tracy

(10) Patent No.: US 8,913,755 B2
(45) Date of Patent: Dec. 16, 2014

(54) LOUDSPEAKER AMPLIFIER INTEGRATION SYSTEM

(76) Inventor: Dennis A. Tracy, Culver City, CA (US)

( * ) Notice: Subject to any disclaimer, the term of this patent is extended or adjusted under 35 U.S.C. 154(b) by 336 days.

(21) Appl. No.: 13/402,657

(22) Filed: Feb. 22, 2012

(65) Prior Publication Data

US 2012/0213382 A1 Aug. 23, 2012

Related U.S. Application Data

(60) Provisional application No. 61/445,234, filed on Feb. 22, 2011.

(51) Int. Cl.
*H04B 3/00* (2006.01)
*H04R 3/00* (2006.01)
*H04R 1/26* (2006.01)

(52) U.S. Cl.
CPC .. *H04R 3/00* (2013.01); *H04R 1/26* (2013.01); *H04R 2420/07* (2013.01); *H04R 2420/05* (2013.01)
USPC .......................................................... 381/77

(58) Field of Classification Search
USPC ............................................ 381/96, 111, 77
See application file for complete search history.

(56) References Cited

U.S. PATENT DOCUMENTS

| | | | | |
|---|---|---|---|---|
| 7,660,602 | B2 * | 2/2010 | Berman et al. | 455/556.1 |
| 8,121,329 | B2 * | 2/2012 | Groset et al. | 381/333 |
| 8,600,301 | B2 * | 12/2013 | Kim | 455/41.2 |
| 2006/0215855 | A1 * | 9/2006 | Rauenzahn | 381/104 |
| 2007/0092088 | A1 * | 4/2007 | Chang | 381/79 |
| 2010/0150383 | A1 * | 6/2010 | Sampat | 381/311 |

* cited by examiner

*Primary Examiner* — Simon Sing
(74) *Attorney, Agent, or Firm* — Welsh Flaxman & Gitler LLC

(57) ABSTRACT

A loudspeaker assembly linked to a amplifier includes a loudspeaker assembly having a housing having a top wall, a bottom wall, and four side walls in which a high frequency driver and a midrange driver are mounted. The loudspeaker assembly further includes a transceiver and associated microprocessor. The amplifier is linked to the loudspeaker assembly. The amplifier includes a transceiver and associated microprocessor. The transceiver of the loudspeaker assembly is paired with the transceiver of the amplifier for the exchange of information with the amplifier.

17 Claims, 7 Drawing Sheets

LOUDSPEAKER AMPLIFIER INTEGRATION SYSTEM

CROSS REFERENCE TO RELATED APPLICATION

This application claims the benefit of U.S. Provisional Application Ser. No. 61/445,234, entitled "LOUDSPEAKER AMPLIFIER INTEGRATION SYSTEM", filed Feb. 22, 2011.

BACKGROUND OF THE INVENTION

1. Field of the Invention

The invention relates to loudspeaker amplifier integration.

2. Description of the Related Art

The vast number of amplifiers and loudspeaker assemblies available in the marketplace makes it highly difficult to optimize the interaction between the amplifiers and loudspeaker assemblies. While some manufacturers produce amplifiers and loudspeaker assemblies as a single package, the majority of loudspeaker assemblies and amplifiers come from separate manufacturers. As such, the settings of the amplifiers are often not optimized for use out of the box in conjunction with a particular set of loudspeaker assemblies and adjustments need to be made to produce the best possible sound. The present invention attempts to address this problem through the provision of a system that integrates the amplifiers with specific loudspeaker assemblies.

SUMMARY OF THE INVENTION

It is, therefore, an object of the present invention to provide a loudspeaker assembly linked to an amplifier including a loudspeaker assembly having a housing. The loudspeaker assembly further includes a transceiver and associated microprocessor. An amplifier is linked to the loudspeaker assembly, the amplifier including a transceiver and associated microprocessor. The transceiver of the loudspeaker assembly is paired with the transceiver of the amplifier for the exchange of information with the amplifier.

It is also an object of the present invention to provide a loudspeaker assembly wherein the amplifier uses the information received from the loudspeaker assembly in adjusting the amplifier settings via the microprocessor for optimal use of the loudspeaker assembly.

It is another object of the present invention to provide a loudspeaker assembly wherein the transceiver of the loudspeaker assembly is a wireless transceiver.

It is a further object of the present invention to provide a loudspeaker assembly wherein the transceiver of the loudspeaker assembly is an RFID tag.

It is also an object of the present invention to provide a loudspeaker assembly wherein the transceiver of the amplifier is a wireless transceiver.

It is another object of the present invention to provide a loudspeaker assembly wherein the transceiver of the amplifier is an RFID interrogator.

It is a further object of the present invention to provide a loudspeaker assembly wherein the microprocessor of the amplifier is provided with Internet access via the provision of WiFi capabilities incorporated into the microprocessor of the amplifier.

It is also an object of the present invention to provide a loudspeaker assembly including a database of loudspeaker assemblies accessible by the amplifier via a communication network.

It is another object of the present invention to provide a loudspeaker assembly wherein the transceiver and microprocessor of the loudspeaker speaker assembly are replaceable.

It is a further object of the present invention to provide a loudspeaker assembly wherein the housing includes a top wall, a bottom wall, and side walls in which a high frequency driver and a midrange driver are mounted. The bottom wall of the housing is selectively secured to the side walls allowing for selective replacement of the bottom wall, and the transceiver and microprocessor are secured to the bottom wall of the housing.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
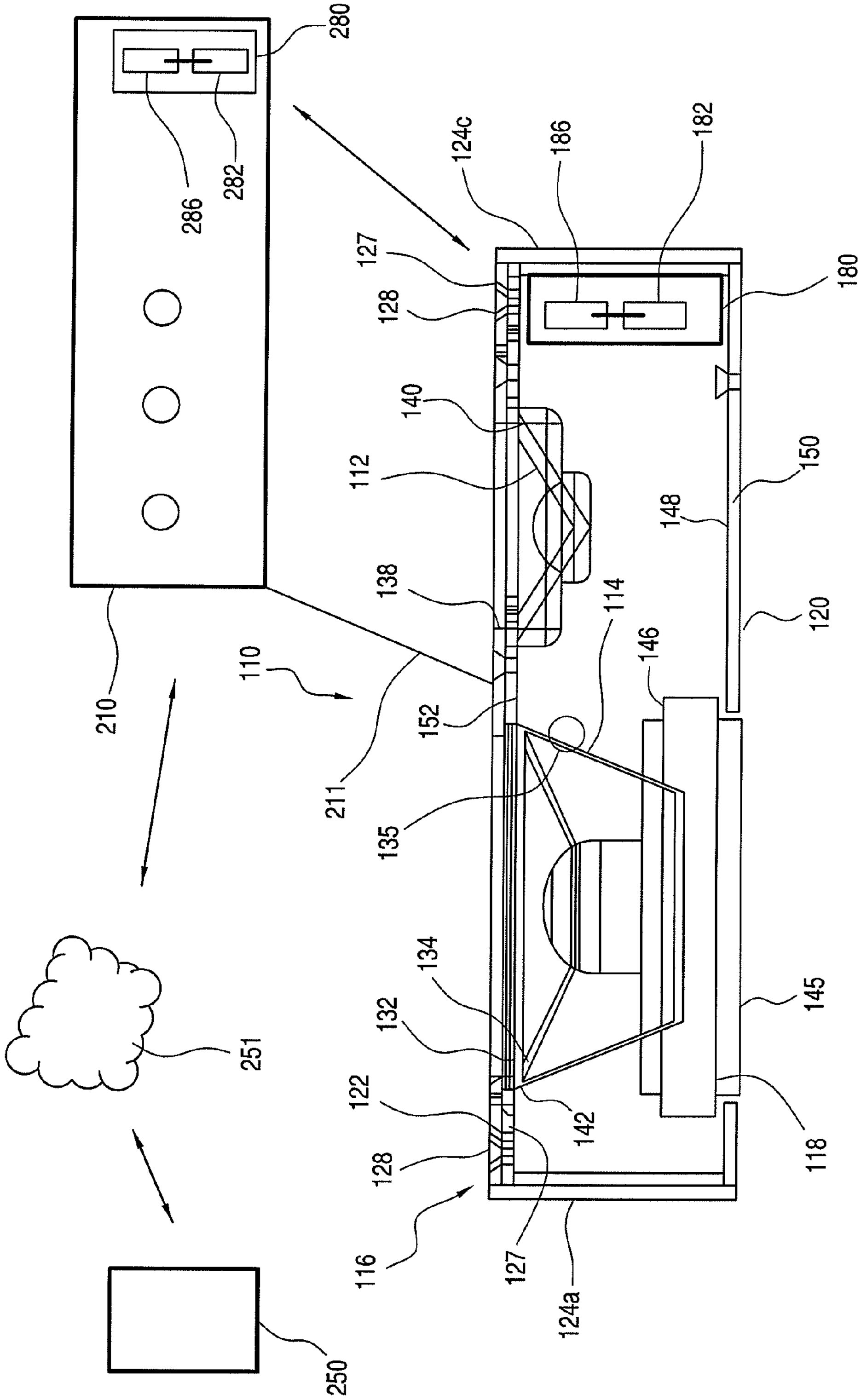
FIG. 1 is schematic of the present system in accordance with a first embodiment.
Figure 2:
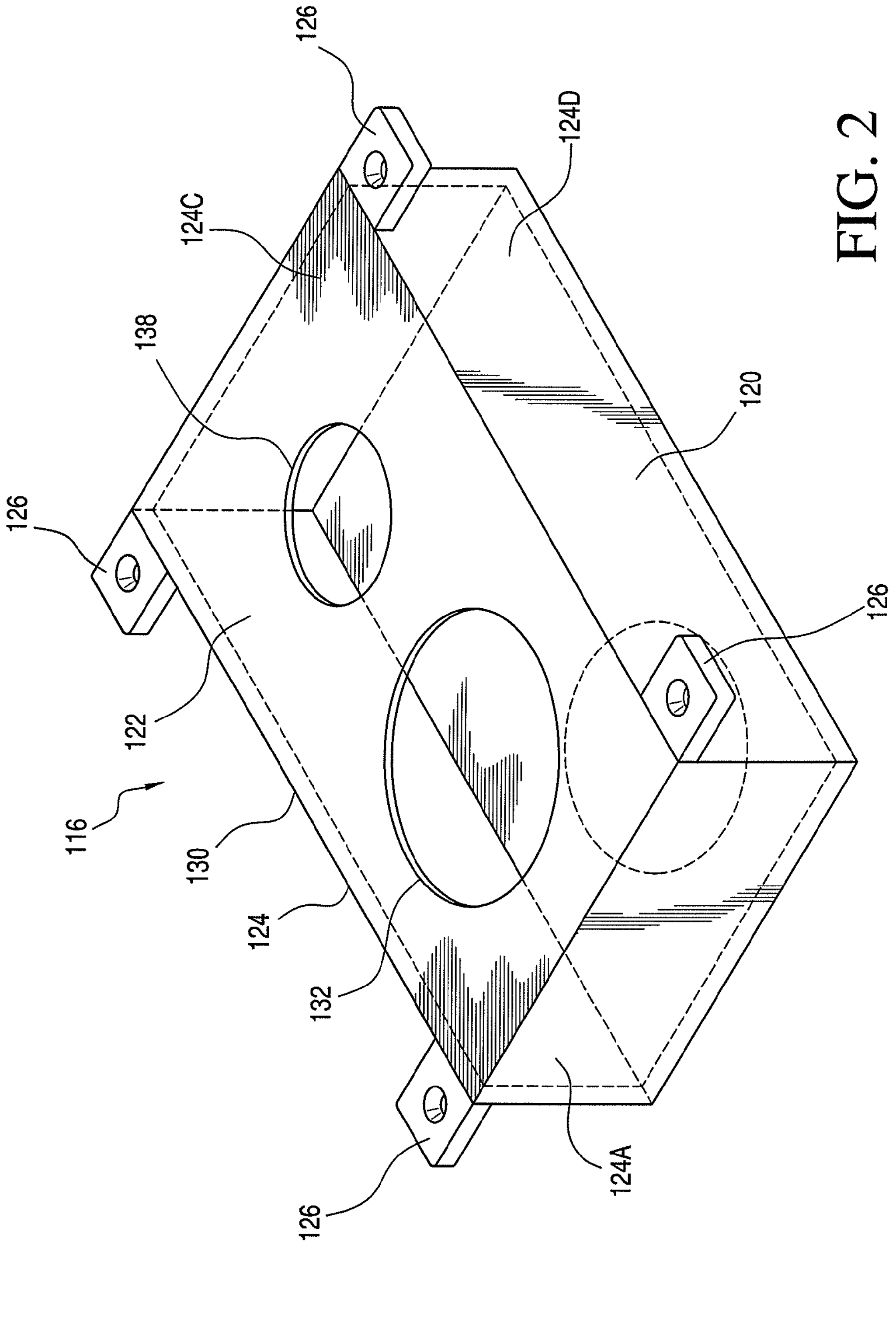
FIG. 2 is a perspective view of the housing employed by the loudspeaker assembly.

In accordance with the present invention, and with reference to the embodiment disclosed with reference to FIGS. 1 and 2, a small profile loudspeaker assembly 110 shaped and dimensioned for use within an aircraft is disclosed. The loudspeaker assembly 110 is linked to an amplifier 210 optimized based upon the size of the enclosure and driver characteristics employed by the loudspeaker assembly 110. By linking the loudspeaker assembly 10 with an optimized amplifier 210 through the provision of the present loudspeaker amplifier integration system, loudspeaker assemblies of various sizes and build characteristics may be employed in different environments without sacrificing the sound quality of the loudspeaker assembly. For example, and as discussed below in greater detail, the amplifier 210 may be optimized to adjust the crossover settings, the amplifier slope, and the power output characteristics.

It is appreciated the amplifier is a traditional amplifier, with the exception of its ability to adjust its output signal for optimization with a pair loudspeaker assembly. As such, the amplifier includes the basic components for audio input from a variety of sources, for example, stereo receiver, MP3 player, computer, CD player, phonograph, etc., as well as the ability to amplify for the input audio signal for transmission to a loudspeaker assembly. As such, the amplification achieved by the amplifier may take a variety of forms so long as the output signal is processed using the present microprocessor and transceiver.

Briefly, and as will be described below in greater detail with reference to the various embodiments disclosed herein, the present loudspeaker amplifier integration system provides a loudspeaker assembly linked to an amplifier capable of optimizing its operating characteristics based upon the specific loudspeaker assemblies to which it is connected. The loudspeaker assembly includes a housing having a top wall, a bottom wall, and four side walls in which a high frequency driver and a midrange driver are mounted. The loudspeaker assembly further includes a transceiver and associated microprocessor. The amplifier is linked to the loudspeaker assembly. The amplifier includes a transceiver and associated microprocessor. The transceiver of the loudspeaker assembly is paired with the transceiver of the amplifier for the exchange of information with the amplifier. It is appreciated the term transceiver is used herein to broadly define a mechanism for communication between the loudspeaker assembly and the amplifier. As such, various mechanisms are contemplated for use in accordance with the present invention.

In accordance with a preferred embodiment, the loudspeaker assembly 110 is designed for positioning within small unused cavities found within the body of an aircraft. In accordance with a preferred embodiment of the present invention, the loudspeaker assembly 110 is designed for mounting within the side wall passenger service unit of newly developing jets. However, those skilled in the art will readily appreciate that the size and weight of the present loudspeaker assembly 110 make possible a wide variety of mounting positions within the body of an aircraft.

The present loudspeaker assembly incorporates a high frequency driver 112, a midrange driver 114, i.e., a lower frequency driver or low frequency midrange, and crossover network (not shown) within a very compact housing 116. While the present loudspeaker assembly 110 provides a wide range of sounds, the loudspeaker assembly 110 may be supplemented by the addition of one, or more, subwoofers positioned at various locations within the aircraft. It is also appreciated the term "loudspeaker assembly" is used herein to refer to various electroacoustic transducers used in the reproduction of sound and may include a single or multiple drivers within an assembly.

The size, shape and weight of the loudspeaker assembly 110 are minimized by implementing a variety of unique design techniques. Briefly, the loudspeaker assembly 110 positions the midrange magnet assembly 118 within the bottom wall 120 of the housing 116 to lower the profile, and reduce the weight, of the loudspeaker assembly 110, compression fits the midrange driver 114 within the housing 116 to reduce weight, improve sound characteristics and add to the overall structural stability of the loudspeaker assembly 110, and utilizes a midrange driver 114 to ultimately reduce the size and weight of the loudspeaker assembly 110. In accordance with a preferred embodiment, the loudspeaker assembly may take the form of the loudspeaker assembly disclosed in the inventor's own prior patent U.S. Pat. No. 6,463,160, entitled "LOW PROFILE LOUDSPEAKER ASSEMBLY", which is incorporated herein by reference.

With the foregoing in mind, and with reference to FIGS. 1 and 2, the loudspeaker assembly 110 includes a housing 116 having a top wall 122, a bottom wall 120, and four side walls 124*a-d*. The housing 116 is preferably manufactured from aluminum, although other lightweight, structurally rigid materials may be used without departing from the spirit of the present invention. The side walls 124*a-d* are formed with outwardly extending mounting flanges 126 used in coupling the present loudspeaker assembly 110 at predetermined locations within the body of the aircraft.

The top wall 122 of the housing 116 is formed separately from the remainder of the housing 116, and is screwed 128 to inwardly extending mounting flanges 127 respectively formed along the top edges 130 of the side walls 124*a-d* of the housing 116. The top wall 122 includes a primary aperture 132 shaped and dimensioned to be slightly smaller than the open end 134 of the midrange cone 136 and a secondary aperture 138 shaped and dimensioned to receive the open end 140 of the high frequency driver 112 cone. The high frequency driver 112 is adhesively bound to the top wall 122 adjacent the secondary aperture 138 in a conventional manner.

The primary aperture 132 is aligned with the midrange cone 136 and permits the direct passage of sound from the midrange driver 114. The top edge 142 of the midrange cone 136 engages the top wall 122 adjacent the primary aperture 132. As such, the midrange driver 114 is securely mounted between the top wall 122 and the bottom wall 120 in a manner that will be discussed below in greater detail.

A driver aperture 144 is formed in the bottom wall 120 of the housing 116. As shown in FIGS. 1 and 2, the midrange magnet assembly 118 is seated within the driver aperture 144. Specifically, the bottom wall 120 of the housing 116 is cut open to form the driver aperture 144. The driver aperture 144 is shaped and dimensioned to receive the smaller diameter bottom section 145 of the midrange magnet assembly 118 while permitting the wide portion 146 of the midrange magnet assembly 118 to sit upon the interior surface 148 of the bottom wall 120. The midrange magnet assembly 118 sits within the driver aperture 144 such that it is substantially flush with the exterior surface 150 of the bottom wall 120. The midrange magnet assembly 118 is wrapped in nonflammable foam (not shown) and is compression fit with the driver aperture 144 to essentially become part of the housing 116.

As a result, when the top wall 122 is screwed onto the remainder of the housing 116, with the midrange driver 114 sitting within the driver aperture 144, the inner surface 152 of the top wall 122 adjacent the primary aperture 132 presses against the top edge 142 of the midrange cone 136 to securely trap the midrange driver 114 between the top wall 122 and the bottom wall 120 of the housing 116.

The midrange driver 114 also requires the creation of a minimal amount of space to properly load the driver. That is, the enclosed space defined by the housing 116 must be sufficient to allow for optimal loading of the midrange driver 114. It is this space which becomes a critical factor for consideration in accordance with the present invention. Accordingly, the present loudspeaker assembly 110 is provided with an integration module 180, for example, a microprocessor 182 coupled to an RF (radio frequency) transmitter 184 or wireless transceiver 186 adapted for use in open wireless transmission of data over short distances (for example, and in accordance with a preferred embodiment of the present invention, a BLUETOOTH transceiver) that when paired or otherwise connected with the amplifier 210 provides information regarding the amplification requirements of the specific loudspeaker assembly 110. BLUETOOTH is a proprietary open wireless technology standard for exchanging data over short distances (using short wavelength radio transmissions in the ISM band from 2400-2480 MHz) from fixed and mobile devices, creating personal area networks with a high levels of security. Although wireless connections are contemplated in accordance with a preferred embodiment of the present invention, it is appreciated wired (for example, the wire 211 through which audio signals are transmitted) or other connections may be employed.

For example, and in accordance with an embodiment of the present invention as shown with reference to FIG. 1, the loudspeaker assembly 110 is provided with a BLUETOOTH transceiver 186 and associated microprocessor 182 (power being provided by the electrical connections to the loudspeaker assembly), the amplifier 210 is similarly provided with an integration module 280, for example, a BLUETOOTH transceiver 286 and associated microprocessor 282. The BLUETOOTH transceiver 286 of the loudspeaker assembly 110 is paired with the BLUETOOTH transceiver 286 of the amplifier 210. Once paired, the loudspeaker assembly 110 exchanges information with the amplifier 210, which the amplifier 210 may then employ in adjusting the amplifier settings via the microprocessor 282 for optimal use of the loudspeaker assembly 110.

Figure 3:
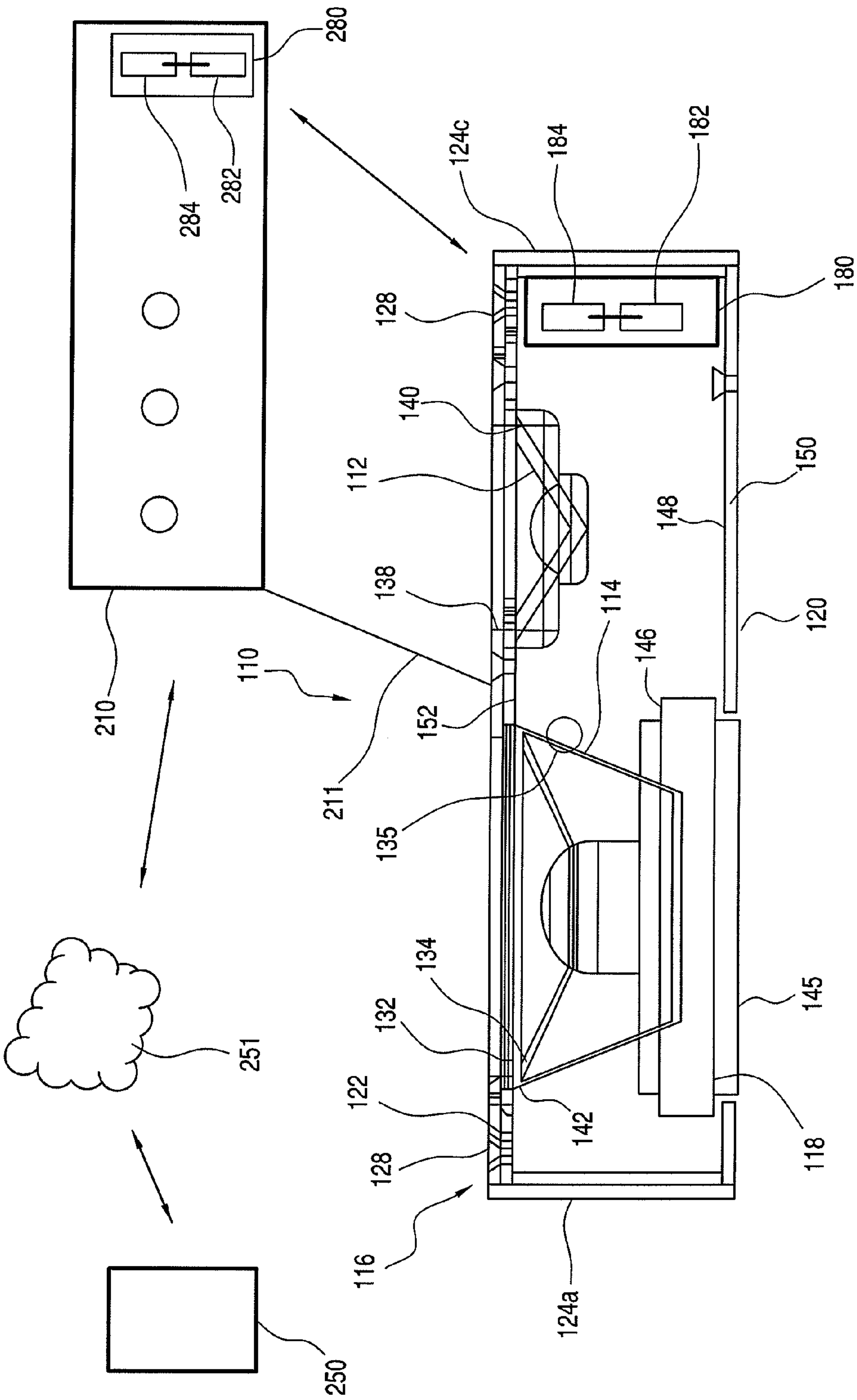
FIG. 3 is a schematic of the present system in accordance with another embodiment.

Similarly, and in accordance with a embodiment of the present invention as shown with reference to FIG. 3, where the loudspeaker assembly 110 includes a transceiver in the form of a passive RFID (radio frequency identification) tag 184 associated with a microprocessor 182, the amplifier 210 is provided with a transceiver in the form of an RFID interrogator 284 (also associated with a microprocessor 282) generating an external electromagnetic field to initiate a signal transmission by the passive RFID tag 184 of the loudspeaker assembly 110. This occurs by simply bringing the loudspeaker assembly 110 into the proximity of the amplifier 210 where a signal transmission is initiated. Once the signal transmission takes place, the loudspeaker assembly 110 exchanges information with the amplifier 210, which the microprocessor 282 of the amplifier 210 may then employ in adjusting the amplifier settings for optimal use of the loudspeaker assembly 110.

As is appreciated, the microprocessor 282 of the amplifier 210 will be capable of only storing information regarding a limited number of the loudspeaker assembly configurations since loudspeaker assemblies will continuously be in development. Accordingly, the amplifier 210, in particular, the microprocessor 282 is provided with Internet access, for example, via the provision of WiFi (wireless transmission in accordance with IEEE 802.11 standards) capabilities incorporated into the microprocessor 282. As such, the amplifier 210 is able to contact a database 250 of loudspeaker assemblies via a communication network 252 (for example, the Internet), download information relevant to the loudspeaker assembly with which the amplifier 210 is being paired and provide appropriate signals for optimizing the operating settings of the amplifier 210 to ultimately optimize the signals sent to the loudspeaker assembly 110 and the sound generated by the loudspeaker assembly 110.

For example, and in accordance with a preferred embodiment, the downloaded information is used by the amplifier 210 to adjust the crossover settings for specific loudspeaker assembly 110 connected to the amplifier 210, the amplifier slope of output signals generated by amplifier 210 and power output characteristics of the amplifier 210. As such, the amplifier 210, based upon information gathered from the loudspeaker assembly 110 and the database 250, will adjust its signal processing characteristics (for example, crossover settings, slope, and power output) differently based upon the power handling and sound characteristics of the loudspeaker assembly 110, that is, a subwoofer will have different power handling characteristics than a midrange loudspeaker assembly or a high frequency (tweeter) loudspeaker assembly. Similarly, loudspeaker assemblies from different manufacturers will exhibit different power handling and sound characteristics.

In accordance with an alternate embodiment, the enclosure of the loudspeaker assembly 310 is actually adjustable and the amplifier 410 is capable of adjusting its output characteristics to optimize the performance of the loudspeaker assembly 310.

Referring to FIGS. 4 to 7, and as with the embodiment previously described, a small profile loudspeaker assembly 310 shaped and dimensioned for use within an aircraft is disclosed. The loudspeaker assembly 310 is linked to an amplifier 410 optimized based upon the size of the enclosure employed by the loudspeaker assembly 310. By linking the loudspeaker assembly 310 with an optimized amplifier 410, speaker assemblies of various sizes may be employed in different environments without sacrificing the sound quality of the loudspeaker assembly.

The loudspeaker assembly 310 incorporates a high frequency driver 312, a midrange driver 314, i.e., a lower frequency driver or low frequency midrange, and crossover network (not shown) within a very compact housing 316. The loudspeaker assembly 310 includes a housing 316 having a top wall 322, a bottom wall 320, and four side walls 324*a-d*. The side walls 324*a-d* are formed with outwardly extending mounting flanges 326 used in coupling the present loudspeaker assembly 310 at predetermined locations within the body of the aircraft.

The bottom wall 320 is selectively secured to the four side walls 324*a-d* allowing for selective replacement of the bottom wall 320 in consideration of the envelope in which one is attempting to position the loudspeaker assembly 310. For example, and with reference to FIGS. 4 and 5, the bottom wall 320 may be a flat planar surface which is directly attached to bottom edges of the four side walls 324*a-d* without adding any depth to the cavity ultimately defined by the housing 316. The bottom wall 320 may, however, take the form of a concave surface (when facing the four side walls) in a manner which increases the depth and volume of the cavity defined by the housing 316 (see FIG. 6) or the bottom wall could even take the form of a convex surface (when facing the four side walls) in a manner which decreases the depth and volume of the cavity defined by the housing. As such, the bottom wall 320 is selectively secured to the four side walls 324*a-d* using conventional attachment mechanisms, for example, nuts and bolts.

The top wall 322 of the housing 316 is also formed separately from the remainder of the four side walls 324*a-d*, and is screwed 328 to the inwardly extending mounting flanges 327 respectively formed along the top edges 330 of the side walls 324*a-d* of the housing 316. The top wall 322 includes a primary aperture 332 shaped and dimensioned to be slightly smaller than the open end 334 of the midrange cone 336 and a secondary aperture 338 shaped and dimensioned to receive the open end 340 of the high frequency driver 312 cone. The high frequency driver 312 is adhesively bound to the top wall 322 adjacent the secondary aperture 338 in a conventional manner.

The primary aperture 332 is aligned with the midrange cone 336 and permits the direct passage of sound from the midrange driver 314. The top edge 342 of the midrange cone 336 is secured to the top wall 322 adjacent the primary aperture 332 using conventional mechanism well known to those skilled in the art.

As with the prior embodiment, the midrange driver 314 requires a minimal amount of space to properly load the driver. That is, the enclosed space defined by the housing 316 must be sufficient to allow for optimal loading of the midrange driver 314. It is this space which becomes a critical factor for consideration in accordance with the present invention and considering the adjustable nature of the housing 316, the relationship between the loudspeaker assembly 310 and the amplifier 410 is critical to optimal sound performance. Accordingly, the present loudspeaker assembly 310 is provided with an integration module 380, for example, a microprocessor 382 coupled to a transceiver in the form of an RF transmitter 384 or BLUETOOTH transceiver 386, that when paired or otherwise connected with the amplifier 410 provides information regarding the amplification requirements of the specific loudspeaker assembly 410. Although wireless connections are contemplated in accordance with a preferred embodiment of the present invention, it is appreciated wired (for example, the wire 411 through which audio signals are transmitted) or other connections may be employed.

Figure 4:
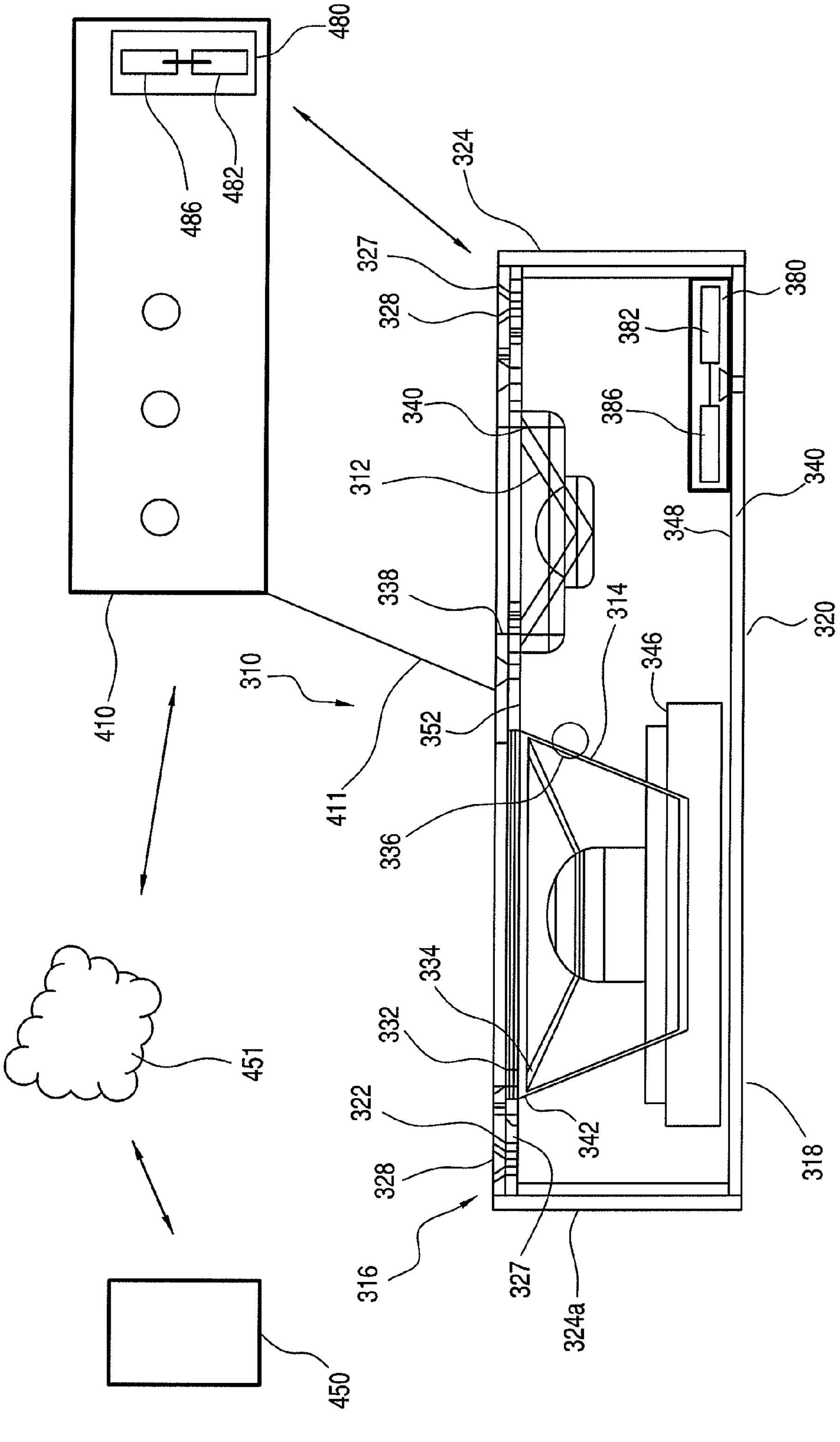
FIG. 4 is schematic of the present system in accordance with a yet a further embodiment.
Figure 5:
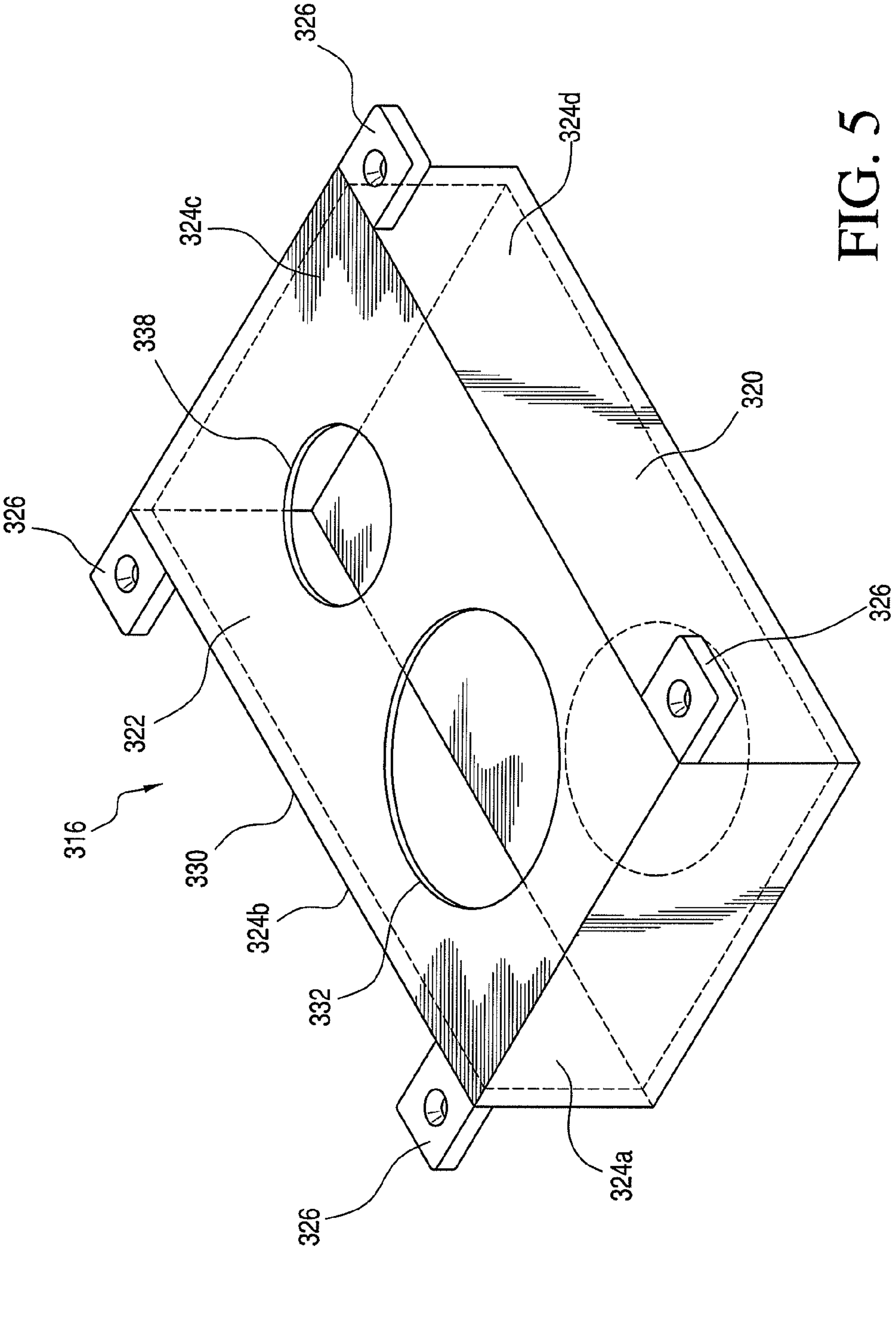
FIG. 5 is a perspective view of the housing employed by the loudspeaker assembly shown in FIG. 4.
Figure 6:
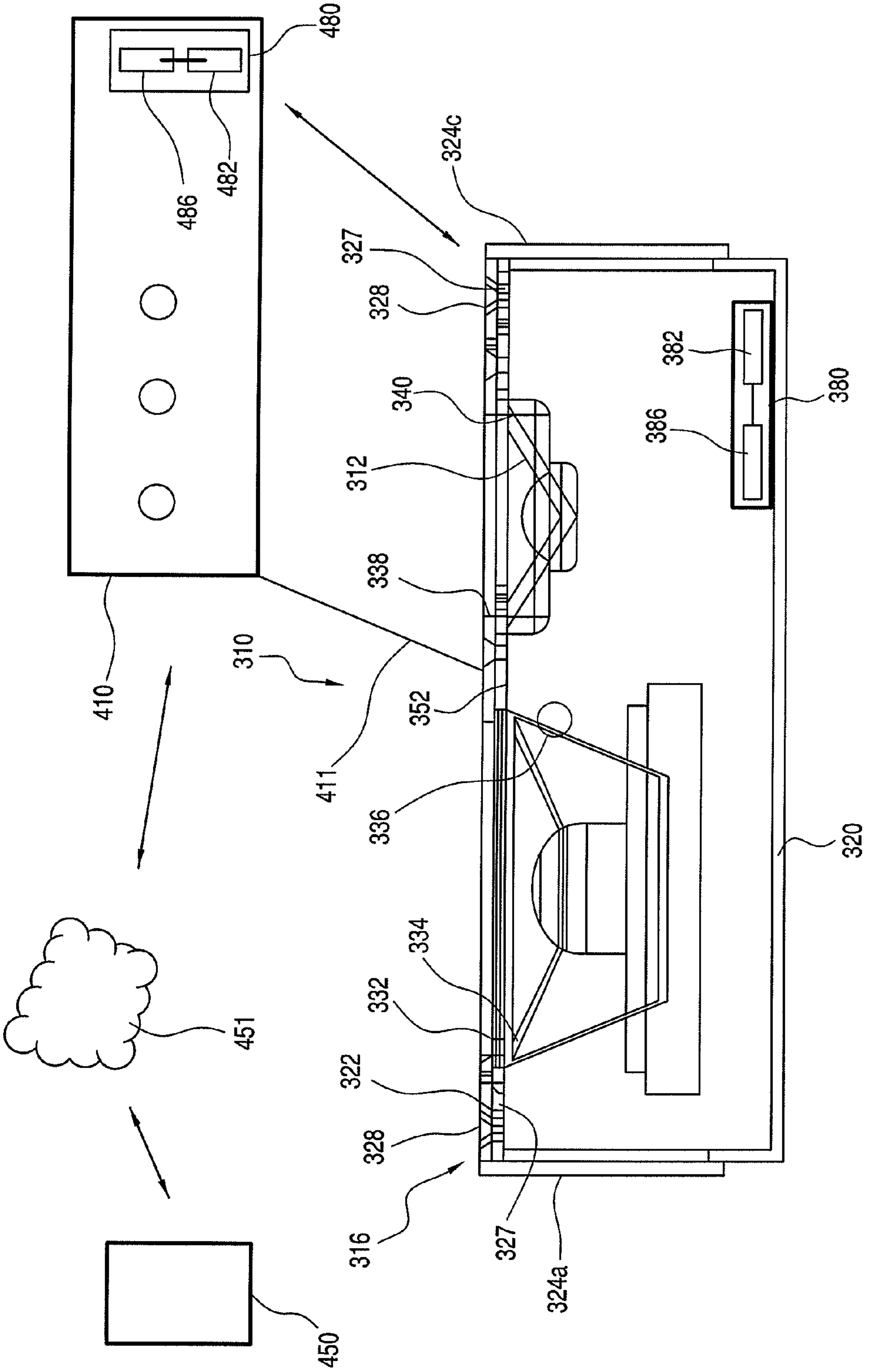
FIG. 6 is a schematic of the present system in accordance with another embodiment.

For example, and in accordance with the embodiments of the present invention as shown with reference to FIGS. 4 and 6, the loudspeaker assembly 310 is provided with a BLUETOOTH transceiver 386 and associated microprocessor 382 (power being provided by the electrical connections to the loudspeaker assembly), the amplifier 410 is similarly provided with a BLUETOOTH transceiver 486 and associated microprocessor 482. The BLUETOOTH transceiver 486 of the loudspeaker assembly 310 is paired with the BLUETOOTH transceiver 486 of the amplifier 410. Once paired, the loudspeaker assembly 310 exchanges information with the amplifier 410, which the amplifier 410 may then employ in adjusting the amplifier settings via the microprocessor 482 for optimal use of the loudspeaker assembly 310.

Because the size of the cavity provided by the loudspeaker assembly 310 is dependent upon which bottom wall 320 is employed for a specific envelope in which the loudspeaker assembly 310 is to be positioned, the integration module 380 is coupled to the bottom wall 320 and thereby adjusted when the bottom wall 320 is selected for attachment to the remainder of the housing 316.

Figure 7:
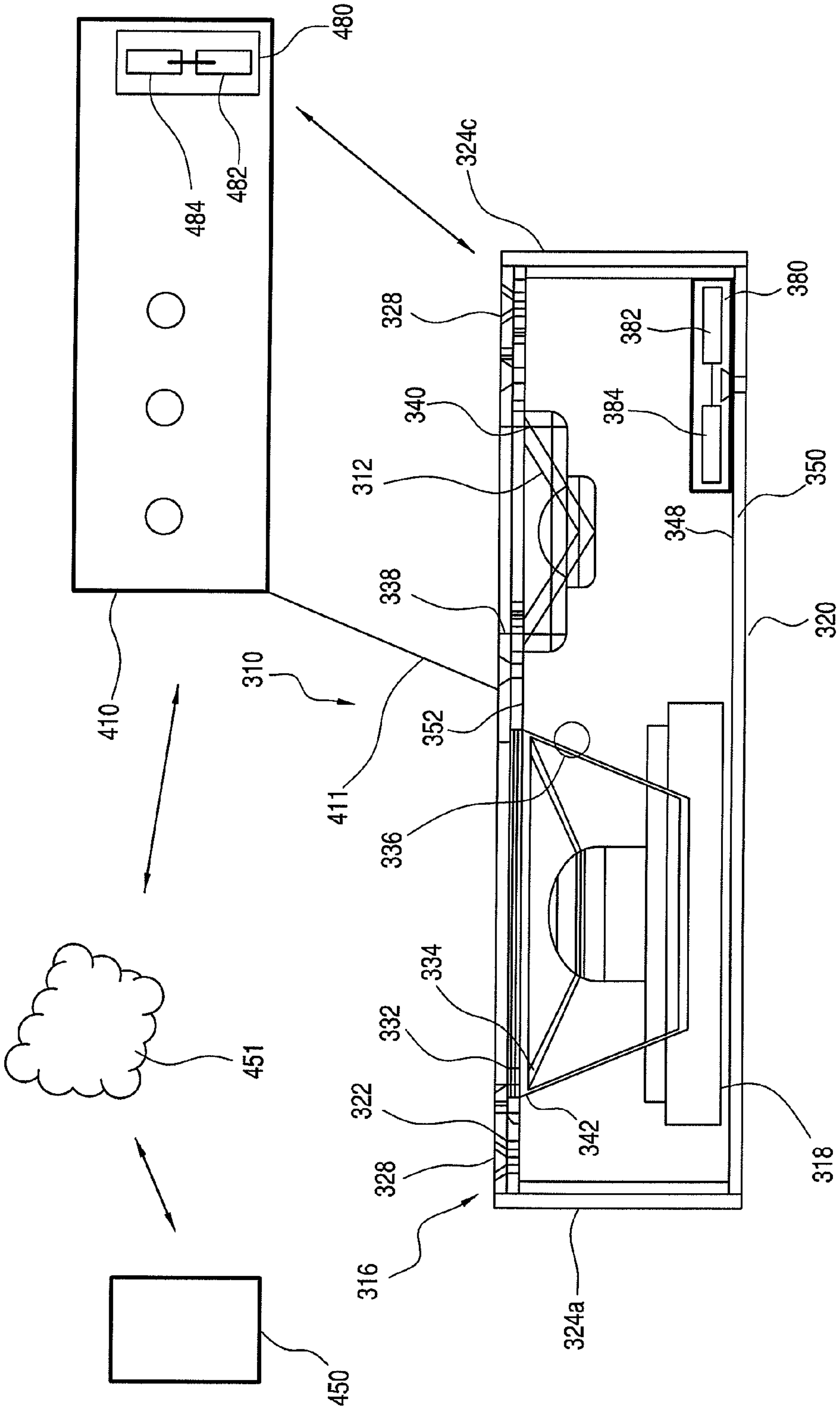
FIG. 7 is a schematic of the present system in accordance with a further embodiment.

Similarly, and in accordance with an embodiment of the present invention as shown with reference to FIG. 7, where the loudspeaker assembly 310 includes a passive RFID tag 384 associated with a microprocessor 382, the amplifier 410 is provided with an RFID interrogator 484 (also associated with a microprocessor 482) generating an external electromagnetic field to initiate a signal transmission by the passive RFID tag 384 of the loudspeaker assembly 310. This occurs by simply bringing the loudspeaker assembly 310 into the proximity of the amplifier 410 where a signal transmission is initiated. Once the signal transmission takes place, the loudspeaker assembly 310 exchanges information with the amplifier 410, which the microprocessor 482 of the amplifier 410 may then employ in adjusting the amplifier settings for optimal use of the loudspeaker assembly 310.

As with the embodiments shown in FIGS. 4 and 6, because the size of the cavity provided by the loudspeaker assembly 310 is dependent upon which bottom wall 320 is employed for a specific envelope in which the loudspeaker assembly 310 is to be positioned, the integration module 380 is coupled to the bottom wall 320 and thereby adjusted when the bottom wall 320 is selected for attachment to the remainder of the housing 316.

Similarly, and as with the prior embodiment disclosed with reference to FIGS. 1 to 3, the microprocessor 482 of the amplifier 410 will be capable of only storing information regarding a limited number of the loudspeaker assembly configurations since loudspeaker assembly will continuously be in development. Accordingly, the amplifier 410, in particular, the microprocessor 482 is provided with Internet access, for example, via the provision of WiFi capabilities. As such, the amplifier 410 is able to contact a database 450 of loudspeaker assemblies via a communication network 451 (for example, the Internet), download information relevant to the loudspeaker assembly 310 with which the amplifier is being paired and provide appropriate signals for optimizing the amplifier settings and ultimately the sound generated by the loudspeaker assembly 310.

It is also appreciated the options for the sound profile of the loudspeaker assembly could be available, and users would be allowed to select the sound profile most related to their listening preferences.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A loudspeaker assembly linked to an amplifier, comprising:

the loudspeaker assembly including a housing, the loudspeaker assembly further including a transceiver and associated microprocessor;

a wire through which audio signals are transmitted linking the amplifier to the loudspeaker assembly, the amplifier including a transceiver and associated microprocessor;

the transceiver of the loudspeaker assembly being paired with the transceiver of the amplifier for the exchange of information with the amplifier.

2. The loudspeaker assembly according to claim 1, wherein the amplifier uses the information received from the loudspeaker assembly in adjusting the amplifier settings via the microprocessor for optimal use of the loudspeaker assembly.

3. The loudspeaker assembly according to claim 1, wherein the transceiver of the loudspeaker assembly is a wireless transceiver.

4. The loudspeaker assembly according to claim 1, wherein the transceiver of the loudspeaker assembly is an RFID tag.

5. The loudspeaker assembly according to claim 1, wherein the transceiver of the amplifier is a wireless transceiver.

6. The loudspeaker assembly according to claim 1, wherein the transceiver of the amplifier is an RFID interrogator.

7. The loudspeaker assembly according to claim 1, wherein the microprocessor of the amplifier is provided with Internet access.

8. The loudspeaker assembly according to claim 7, further including a database of loudspeaker assemblies accessible by the amplifier via a communication network.

9. The loudspeaker assembly according to claim 1, wherein the transceiver and microprocessor of the loudspeaker speaker assembly are replaceable.

10. The loudspeaker assembly according to claim 9, wherein the housing includes a top wall, a bottom wall, and side walls in which a high frequency driver and a midrange driver are mounted, the bottom wall of the housing is selectively secured to the side walls allowing for selective replacement of the bottom wall, and the transceiver and microprocessor are secured to the bottom wall of the housing.

11. The loudspeaker assembly according to claim 9, wherein the amplifier uses the information received from the loudspeaker assembly in adjusting the amplifier settings via the microprocessor for optimal use of the loudspeaker assembly.

12. The loudspeaker assembly according to claim 9, wherein the transceiver of the loudspeaker assembly is a wireless transceiver.

13. The loudspeaker assembly according to claim 9, wherein the transceiver of the loudspeaker assembly is an RFID tag.

14. The loudspeaker assembly according to claim 9, wherein the transceiver of the amplifier is a wireless transceiver.

15. The loudspeaker assembly according to claim 9, wherein the transceiver of the amplifier is an RFID interrogator.

16. The loudspeaker assembly according to claim 9, wherein the microprocessor of the amplifier is provided with Internet access.

17. The loudspeaker assembly according to claim 16, further including a database of loudspeaker assemblies accessible by the amplifier via a communication network.

* * * * *